(12) United States Patent
Calabretta et al.

(10) Patent No.: US 8,478,125 B2
(45) Date of Patent: Jul. 2, 2013

(54) OPTICAL PON NETWORK USING PASSIVE DPSK DEMODULATION

(75) Inventors: Nicola Calabretta, Pisa (IT); Marco Presi, Pisa (IT); Giampiero Contestabile, Pisa (IT); Pierpaolo Ghiggino, Spa (IT); Ernesto Ciaramella, Rome (IT); Fabio Cavaliere, Filettole (IT); Roberto Proietti, Davis, CA (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 464 days.

(21) Appl. No.: 12/600,606

(22) PCT Filed: Apr. 24, 2008

(86) PCT No.: PCT/EP2008/055005
§ 371 (c)(1),
(2), (4) Date: May 24, 2010

(87) PCT Pub. No.: WO2008/145464
PCT Pub. Date: Dec. 4, 2008

(65) Prior Publication Data
US 2010/0239258 A1 Sep. 23, 2010

(30) Foreign Application Priority Data
May 31, 2007 (GB) .................. 0710327.8

(51) Int. Cl.
*H04J 14/00* (2006.01)
*H04J 14/02* (2006.01)

(52) U.S. Cl.
USPC ............................... 398/87; 398/71

(58) Field of Classification Search
USPC ........... 398/66–68, 70–72, 74, 75, 87
See application file for complete search history.

(56) References Cited

U.S. PATENT DOCUMENTS 5,907,417 A * 5/1999 Darcie et al. ............ 398/20
8,078,061 B2 * 12/2011 Lee et al. ............... 398/163

(Continued)

OTHER PUBLICATIONS

H. Takenouchi et al., "An Optical Phase-Shift Keying Direct Detection Receiver Using a High-Resolution Arrayed-Waveguide Grating", Optical Fiber Communication Conference 1999, paper TuO4, pp. 213-215.*

(Continued)

*Primary Examiner* — Dalzid Singh
(74) *Attorney, Agent, or Firm* — Nixon & Vanderhye, P.C.

(57) ABSTRACT

An optical PON network comprises a central office which generates N DPSK modulated optical signals, where N is an integer greater than 1, an optical coupling which connects the N signals to at least one optical fiber, a passive distribution node located remotely from the central office which has at least one input port that is coupled to the fiber and a plurality of output ports, the node being arranged to transmit a first wavelength of the N signals to at least one of its output ports, and at least one optical network unit connected through a respective optical fiber to the first output port of the passive distribution node. The passive distribution node comprises an arrayed waveguide grating which provides a passive optical connection between its input port and the first output port and which for that connection functions as a bandpass filter having a profile and bandwidth selected such that the DPSK optical signal passed to the input node is converted to an intensity modulated signal at the output port.

15 Claims, 4 Drawing Sheets

U.S. PATENT DOCUMENTS

| | | | |
|---|---|---|---|
| 2006/0203844 A1* | 9/2006 | Knittle et al. | 370/466 |
| 2008/0089692 A1* | 4/2008 | Sorin | 398/135 |
| 2008/0175592 A1* | 7/2008 | Dai | 398/87 |
| 2008/0232815 A1* | 9/2008 | Shioiri et al. | 398/140 |
| 2008/0240736 A1* | 10/2008 | Ji et al. | 398/202 |

OTHER PUBLICATIONS

International Search Report for PCT/EP2008/055005, mailed Jul. 31, 2008.

Jacobsson et al., "DPSK Modulation Format for Optical Communication Using FBG Demodulator", Linkoping University, Dept. of Science and Technology, Mar. 25, 2004, pp. 1-50, XP007905250.

Prat, "High-Density Passive Fiber-to-the-Home Networks", Transparent Optical Networks, 2005, Proceedings of 2005 7th International Conference Barcelona, Catlonia, Spain, Jul. 3-7, 2005, Piscataway, NJ, USA, IEEE, vol. 2, pp. 33-37, XP010834485.

Chun et al., "An Optical Network Unit for WDM Access Networks with Downstream DPSK and Upstream Remodulated ook Data using Injection-Locked fp Laser", IEEE Photonics Technology Letters, IEEE Service Center, Piscataway NJ, US, vol. 15, No. 10, Oct. 1, 2003, pp. 1476-1478, XP011101406.

Chan et al., "A Novel Wavelength Shift Keying Transmitter Based on Optical Phase Modulation", IEEE Photonics Technology Letters, IEEE Service Center, Piscataway, NJ, US, vol. 16, No. 7, Jul. 1, 2004, pp. 1739-1741, XP011114369.

D'errico et al., "Demonstrating Frequency-Periodic Gaussian Filtering for WDM-DPSK Detection", Optical Fiber Communication Conference, 2006 and the 2006 National Fiber Optic Engineers Conference, IEEE, PI, Mar. 5, 2006, pp. 1-3, XP007905254.

International Preliminary Report on Patentability mailed Dec. 10, 2009 in PCT Application No. PCT/EP2008/055005.

* cited by examiner

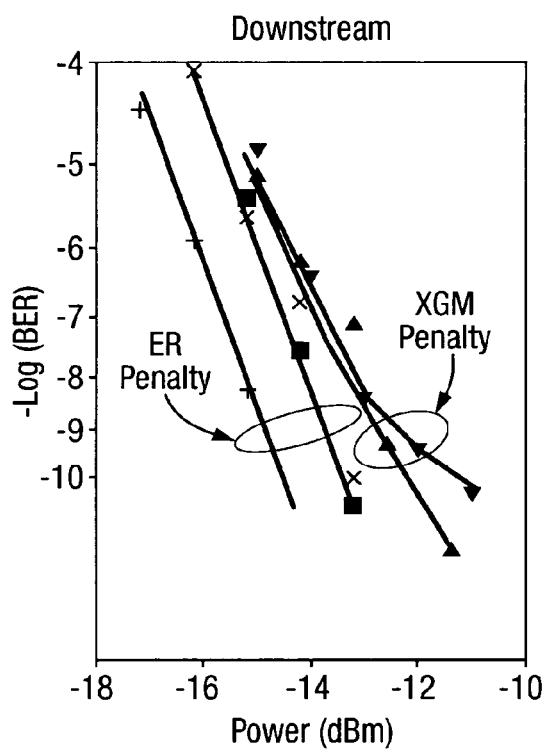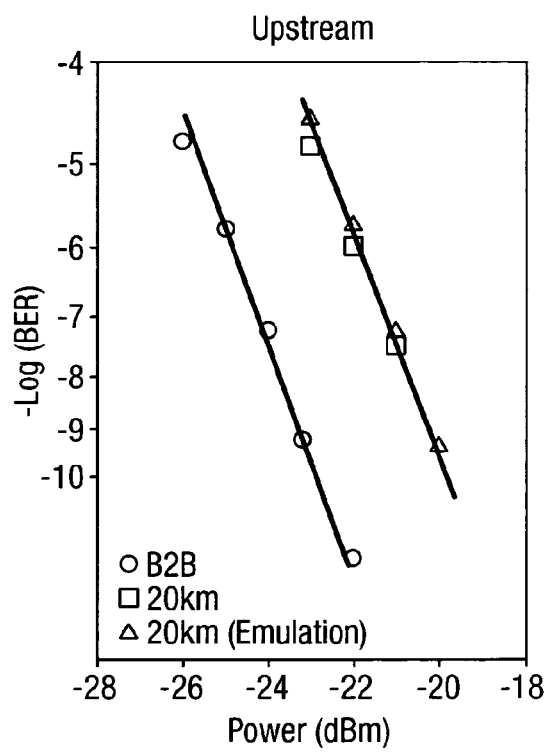
Fig.3a) Downstream
Fig.3b) Upstream
+ B2B ER = 10.2dB
■ B2B ER = 6.6dB
× At 20km
▲ 1 Upstream ch
▼ 8 Upstream ch (Emulation)

OPTICAL PON NETWORK USING PASSIVE DPSK DEMODULATION

This application is the U.S. national phase of International Application No. PCT/EP2008/055005, filed 24 Apr. 2008, which designated the U.S. and claims priority to Great Britain application No. 0710327.8, filed 31 May 2007, the entire contents of which is hereby incorporated by reference.

FIELD OF THE INVENTION

This technology disclosed herein relates to improvements in optical networks, in particular passive optical networks (PON's).

BACKGROUND OF THE INVENTION

Access networks are known of the kind in which a central office, usually located at a providers premises, is connected by optical fibre to a number of optical network units (ONUs) usually located at a residential premises or business premises. To reduce costs these networks are often passive, called optical PON networks, usually meaning that the routing devices between the central office CO and the ONUs do not require any power or light sources. This reduces infrastructure costs greatly and means all optical sources are located at the providers premises which increases safety. The fibres may be of the order of a few km in length, with the main limitation in a passive network being optical transmission losses.

In a simple arrangement, one wavelength is used for downstream signals and time division multiplexing (TDM) is used to allocate a portion of the signal to each ONU. A different wavelength may be used for upstream signals. A simple passive splitter can then be used to send the correct portion of signal to each ONU.

In a refinement it is also known to use wavelength division multiplexing (WDM) whereby optical signals at more than one wavelength are sent out by the CO, with each ONU being allocated one wavelength (although they could be allocated more than one). Each signal can then be modulated with information to be sent to an ONU. To route the correct wavelength signal to the correct ONU, a passive distribution node is provided which taps into the optical fibre from the CO. The function of the node is to separate out the wavelengths and send them to the correct ONU's. Using more than one wavelength increases the capacity of the network compared with simple TDM networks with a single wavelength.

Many different forms of modulation can be used, although one known network that has been proposed uses differential phase shift keying (DPSK) to encode information on each optical signal. In this scheme, information is encoded on an optical signal by changing or modulating the phase of the signal. The information can then be recovered from the signal by looking at the phase of the signal, and in the particular case of DPSK comparing the phase of a given "bit" of the signal with that of a preceding but. This modulation scheme is advantageous because an inherent property of DPSK is that it suffers little from cross gain modulation when semiconductor optical amplifiers are in the network.

To decode the modulated signals it has been proposed to provide at each ONU a phase sensitive demodulator, typically in the form of a Mach Zender type interferometer. In a simple implementation this comprises a delay line interferometer in front of a photodiode. Since DPSK encodes a binary signal by changing the phase of the signal over time, the delay line allows a bit of signal to be compared to an earlier (delayed) bit of signal using the interferometer. The output of the interfermoter will be intensity modulated and can be read using the photodiode to show how the phase changes from bit to bit.

The applicant has appreciated that the provision of a line delay interfermoter at each ONU is costly. Problems also arise due to the effects of chromatic dispersion between the distribution node and the ONU's.

Whilst this can be overcome with the use of dispersion compensating fibre that again adds to the cost.

SUMMARY

According to a first aspect the technology disclosed herein provides an optical network comprising:

a central office (CO) which generates N differential phase shift key DPSK modulated optical signals, each encoding information to be transmitted across the network, where N is an integer greater than 1, optical coupling means which connects the N signals to at least one optical waveguide, such as an optical fibre, a passive distribution node located remotely from the central office which has at least one input port that is coupled to the fibre and a plurality of output ports, the node being arranged to transmit a first wavelength of the N signals to at least one of its output ports, and at least one optical network unit (ONU) connected through a respective optical waveguide to the first output port of the passive distribution node, characterised in that the passive distribution node comprises an arrayed waveguide grating (AWG) which provides a passive optical connection between its input port and the first output port and which for that connection functions as a bandpass filter having a profile and bandwidth selected such that the DPSK optical signal passed to the input node is converted to an intensity modulated signal at the output port.

The use of an AWG to perform, in one device, conversion from DPSK to IM (Intensity Modulation) at the same time as performing the distribution of wavelengths to different output ports eliminates the need for the decoding of the DPSK signal to be performed at the ONU. This can offer a reduction in cost and increased robustness.

The central office CO will typically be provided in a central location with the fibre carrying the signals to a passive distribution node located at a business, home users premises or a kerbside, with fibre length of several Kms or more to provide a local loop network.

The AWG may function as narrow bandpass filter having a bandwidth of between 0.4 and 0.7 times the bit rate of the DPSK signal, and preferably between 0.5 and 0.7 times, and most preferably substantially or exactly 0.6 times. The bandwidth is taken as the 3 db bandwidth, The AWG may function as a filter having an approximately, or exactly, Gaussian profile in the frequency domain, The AWG may connect a single input port to N output ports where N is greater than 10 or 20 or more. There may be as many output ports as there are DPSK modulated signal wavelengths sent out by the central office CO. The AWG may send only a single wavelength to each of its output ports as is known in the art.

Each output port of the passive distribution node may be connected to a respective optical network unit (ONU).

The ONU may comprises a direct detector, such as a photodetector whose output is passed to an amplifier. This is far cheaper than a prior art interferometric detector.

The or each ONU may include a reflective semiconductor optical amplifier (RSOA) that modulates the received signal and retransmits it back to the passive distribution node. It may send it back to a separate output node of the AWG, perhaps along with one or more other return signals joined through a power splitter. The AWG, exploiting its recirculating property, will then connect it back to the fibre connected to the central office where it can be detected and demodulated. This forms a totally passive network in which all optical signals are created at the CO only.

The DPSK modulated optical signals may also be time divisional multiplexed (TDM) in that for a signal sent out from the CO the modulation may only be applied for a given time period, the spaces in between being unmodulated so they can be modulated by the ONU to encode the upstream signals sent back to the CO. Thus, the signal at the output port of the AWG will comprise a TDM-IM signal.

The central office CO may transmit DPSK modulated signals with a wavelength of substantially 1550 nm. They may range between 1540 and 1560 nm for example. This ensures that the optical fibre losses are minimised for most types of optical fibre.

The central office CO may modulate the signals at a rate of 20 Gbits/second, or 10 Gbit/second or perhaps 50 or 100 Gbits per second.

The optical coupling means may comprise an optical circulator. It may be followed by a bi-directional semiconductor optical amplifier to boost downstream and upstream signals at the central office.

The optical network may be passive, a PON, and may comprise an access network. The optical signals may be modulated with a range of different information depending on the services provided by the operator of the CO and/or requirements of the owner or user of the ONU's. Typically, the information may comprise voice data, video data or Internet data or the like, or a combination of these types of data.

According to a second aspect the technology disclosed herein provides a passive distribution node for use in a passive Optical PON network comprising a narrow bandwidth arrayed waveguide grating (AWG) having at least one input port for connection to a central office (CO) and at least two output ports, each being suitable for connection to an optical network unit (ONU), in which the AWG functions as a bandpass filter having a substantially Gausian profile in the frequency domain with respect to each connection between the input node and the output nodes.

The AWG may have more than two output nodes and may function as a narrow bandwidth filter with a gausian profile for each connection between the input port and an output port.

The AWG may have, for each connection from input port to output port, a filter bandwidth of 0.6 times the expected input signal encoding bit rate. In this way the filter will mimic the effect of a suitable delay line interferometer for decoding the DPSK signals.

Many established fibre optic networks transmit light having a central frequency of and a modulation rate (bit rate) of 10 GHz, 20 ghz or 40 Ghz or more. The AWG bandpass filter may therefore be selected to provide a bandwidth of approximately 0.6 times this, e.g. 6 Ghz, 12 Ghz or 24 Ghx respectively.

The distribution node could, it is believed, be readily used to upgrade existing optical PON's since it does not require a change in function of the central office or relaying of optical fibre when used in any system which already employs DPSK modulation.

LIST OF FIGURES

There will now be described, by way of example only, one embodiment of the technology disclosed herein with reference to the accompanying drawings of which:

FIG. 3 shows BER measurements for (a) downstream and (b) upstream channels of the experimental set-up;

DETAILED DESCRIPTION OF AN EMBODIMENT

Figure 1:
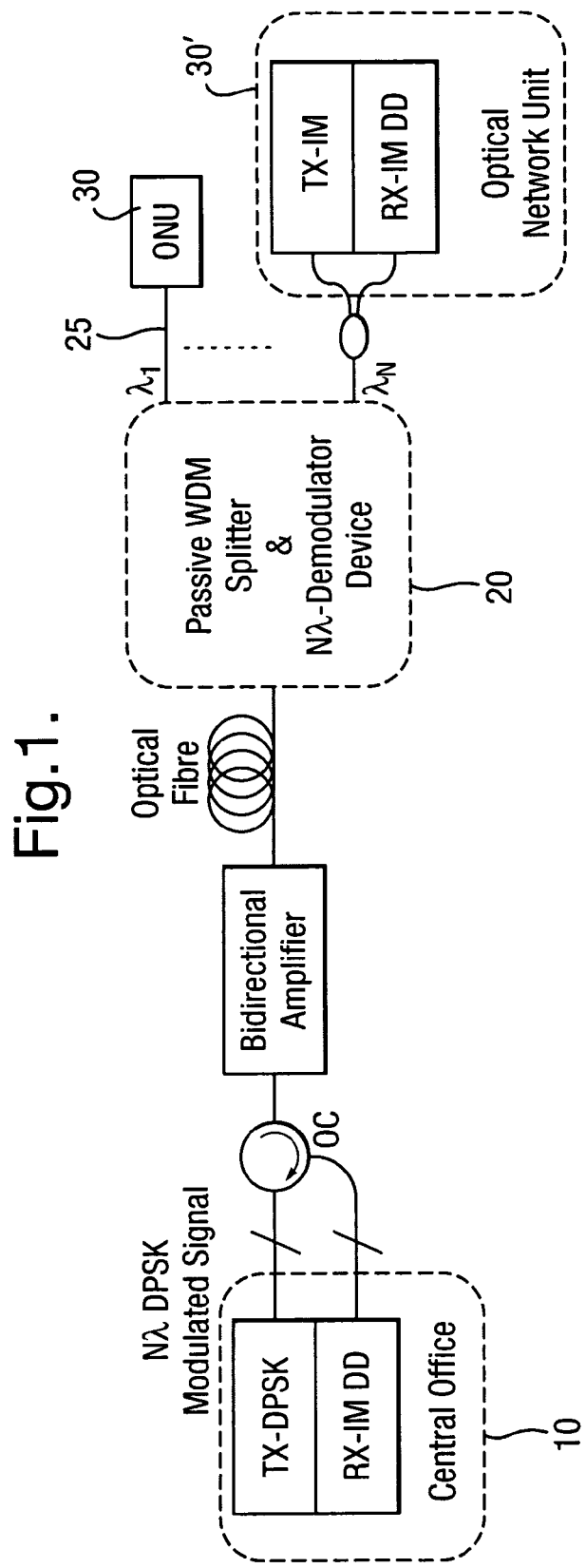
FIG. 1 is a schematic overview of an experimental embodiment of a passive PON in accordance with the first aspect of the technology disclosed herein.

The network shown in FIG. 1 of the accompanying drawings relies on NRZ-DPSK (Non-Return to Zero DPSK) downstream signals and a passive WDM splitter able to perform multi-wavelength demodulation. The passive splitter functions simultaneously in the role of channel distributor, simultaneous demodulator for all DPSK channels, and eliminates the need for chromatic dispersion compensation. A bidirectional optical amplifier, e.g. a saturated SOA, provides bidirectional amplification to compensate for the TDM splitter losses.

The network comprises a central office 10, typically located at a providers premises. This performs the function of sending downstream signals encoding information through an optical fibre 15 or other equivalent optical path (the term optical fibre in this application should be given a broad interpretation to cover groups of fibres, optical waveguides etc). The central office 10 also performs the function of receiving upstream signals from the fibre and extracting encoded information from them. In other arrangements, the central office may simply pass through signals it has received from other networks, rather than generating them or decoding them.

The optical fibre 15 is connected to a remote passive distribution node 20 which splits the multiple wavelengths out so that one wavelength is passed to a single output port. Thus, for N input wavelengths on a single fibre from the PON it will split them out onto N output ports.

Connected to each output port through a further length or lengths of optical fibre 25 in the example is a optical network unit 30, typically located at a subscribers premises. This functions to decode the information encoded on the optical signal it receives. It also sends back to the distribution node a return signal which is encoded with information. Thus, two way communication is established between the central office and the OPU's.

The central office 10 uses differential phase shift keying (DPSK) to encode information on each optical signal sent downstream. The passive distribution node converts this to intensity modulation at the output port so that the ONU need only be arranged to read intensity signals, rather than have to perform phase based demodulation.

Figure 4:
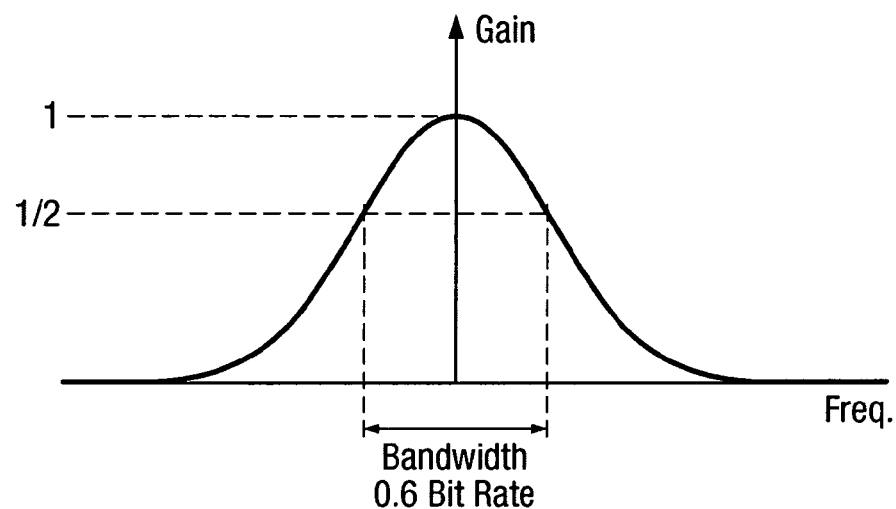
FIG. 4 is a graph showing a suitable response curve for a channel of the AWG in the frequency domain.

In the example shown, the WDM splitter is realized by a custom narrow-band array wavelength grating (AWG) filter located at the distribution node. The AWG is a selected component with a Gaussian profile and a bandwidth on each channel of 0.6 times the bit-rate as shown in FIG. 4 of the accompanying drawings. It is the key component of the architecture, playing threefold role. It acts as WDM channel distributor to the ONUs. It also demodulates simultaneously all the DPSK downstream signals, thus removing the costly and wavelength dependent demodulator at each ONU and making the receiver just a simple photodiode. Moreover, it allows the signals to tolerate a larger amount of accumulated chromatic dispersion, avoiding the extra losses of the DCF.

Figure 5:
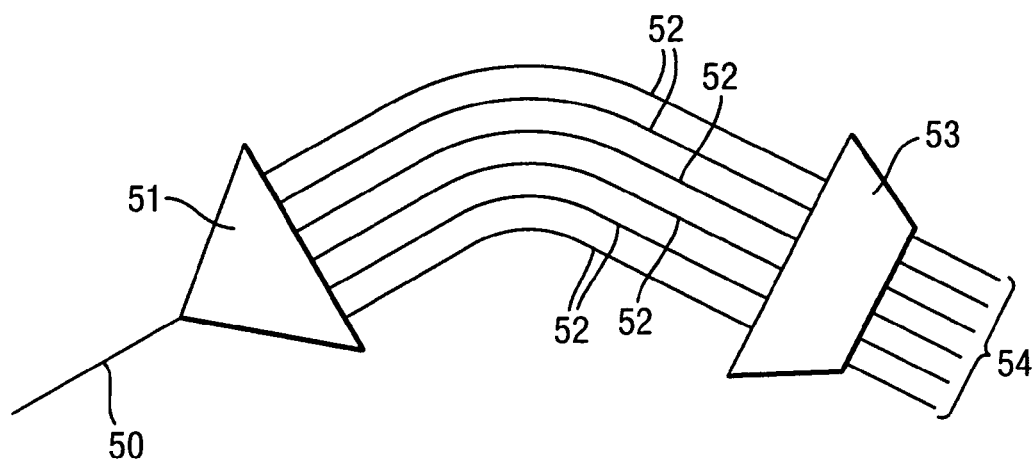
FIG. 5 is a representation of one type of AWG based on the use of multiple planar lightguides deposited on a silica substrate.

An example of an architecture for an AWG is given in FIG. 5 of the accompanying drawings. It comprises a set of planar lightguides 52 of differing lengths fabricated on a silicon substrate. An input port 50 is connected to the input fibre from the CO, and is spaced from one end of the lightguides by a freespace region 51 so that incoming light diffracts at the interface between the port 50 and the free space region 51. Each lightguide 52 has a slightly different length and the optical waves coupled to each guide 52 undergo a different phase change (dependent on the length of the lightguide). The other ends of the lightguides are arranged in a linear array at one side of a second free space region 53, and light diffracts from each waveguide across the second free space region 53 to a set of waveguides which are respectively connected to one of a set of output ports 54. Due to constructive interference between the light from each waveguide each output port will receive light of a different wavelength.

Experimental Validation

The scheme was experimentally validated using a bidirectional single feeder system with 8 WDM DPSK channels at 20 Gbit/s transmitted over 20 km of standard single mode fibre (SMF) and IM-DD re-modulated at 1 Gbit/s by means of a RSOA.

Figure 2:
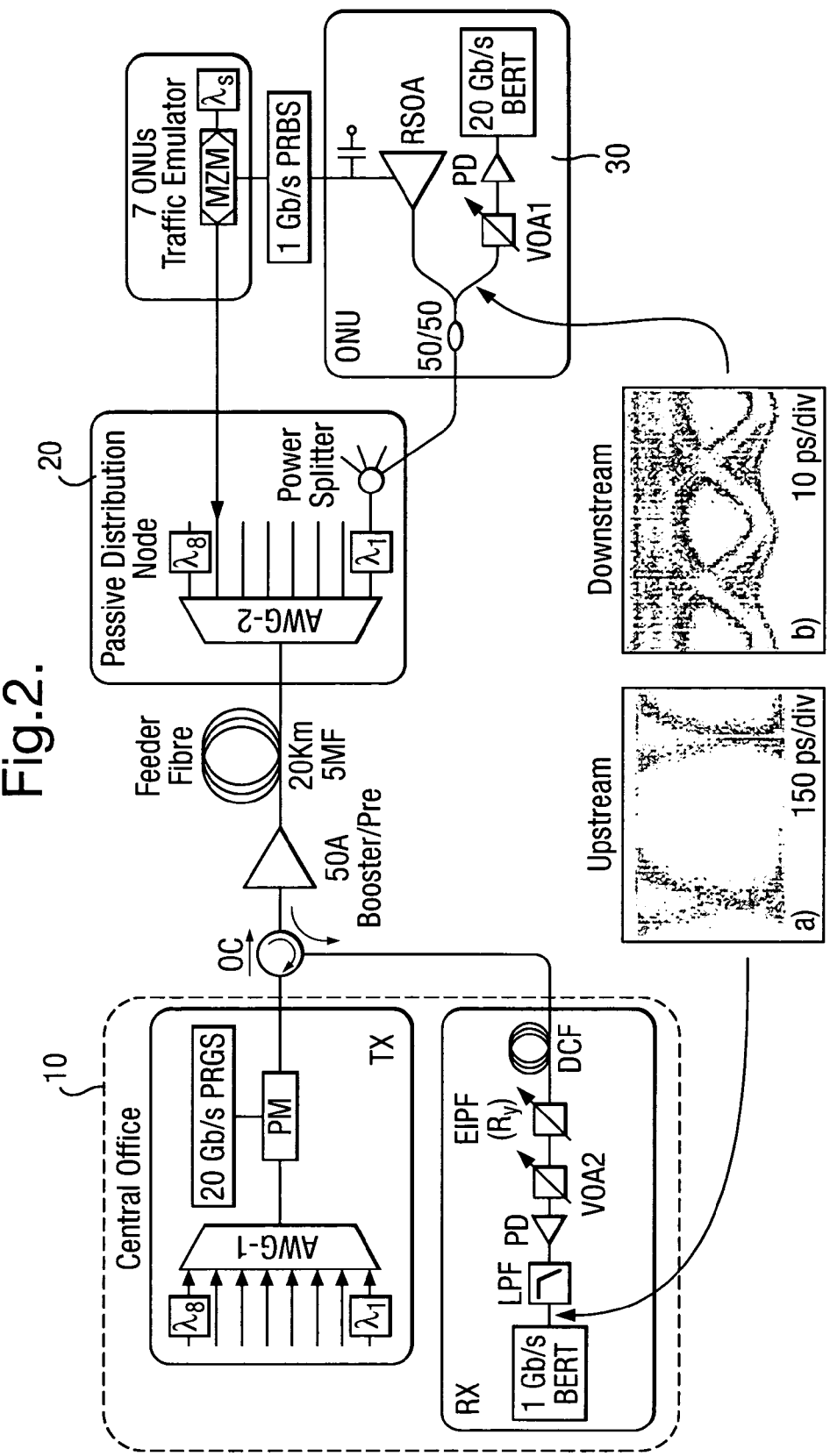
FIG. 2 is detailed view in schematic of the experimental set up of FIG. 1 used to prove the concept.

The experimental setup is shown in FIG. 2 of the accompanying drawings. At the Central Office (CO) 8 downstream DPSK channels on a 200 GHz grid (from $\lambda_1$=1542.9 nm to $\lambda_8$=1554.1 nm) were wavelength multiplexed by the AWG-1, and modulated by a single $LiNbO_3$ phase-modulator (PM). This modulator, which produces no spurious IM, was driven by a $2^7-1$ Pseudo Random Bit Sequence (PRBS), which is the closest to 8B/10B Gigabit Ethernet, at 21.7 Gb/s. The bit-rate of 21.7 Gb/s was chosen according to properly match the AWG-2 bandwidth. In order to reduce the optical Extinction Radio (ER) of the demodulated downstream traffic, the amplitude of the electrical driving signal $V_{data}$ was lowered, i.e. below the $V_\pi$ value of the modulator. By controlling $V_{data}$ we could produce signals with ER values ranging from 4 to 10.2 dB.

After passing through an Optical Circulator (OC) used to select the upstream traffic, the 8 downstream channels were amplified by the SOA (Semiconductor Optical Amplifier). The SOA is a commercial device with. 17 dB small signal gain at 500 Ma, 10 dBm output saturation power, 0.8 dB of PDG and 6.9 dB noise figure. Input and output power at the SOA was 0 dBm and 9 dBm, respectively.

The SOA acted simultaneously as booster and pre-amplifier for the downstream and upstream traffic, respectively. Note that due to the CE (Constant Envelope) property of the DPSK signals, XGM (Cross-Gain Modulation) among the downstream channels in the SOA is suppressed. The limited amount of Four Wave Mixing (FWM) products (−34 dB lower than the signals), can be neglected.

The 8 amplified channels were launched into the SMF (Single Mode Fiber) feeder (G652, 20 km-long, chromatic dispersion D-16.5 ps/nm/km and 4.2 dB of loss) and reached the passive distribution node. This was realized by means of a custom AWG (AWG-2 in the figure) with 32 channels spaced by 50 GHz on the ITU-T grid. The FWHM (Full Wove Half Maximum) of each channel is 12.5 GHz, with almost Gaussian profile and no spurious dispersion. The AWG-2 insertion loss was around 4 dB at each peak transmission wavelength. This device plays a major role in the architecture. It routes the WDM signals to distinct colorless ONUs and also acts as simultaneous demodulator on each DPSK channel, Indeed, a narrow-band optical filter with these characteristics (Gaussian profile, FWHM equal to 60% of the bit-rate) converts the DPSK signals to IM signals. Furthermore, this detection scheme allows for higher tolerance to the accumulated dispersion, which at 20 Gb/s becomes ≈4000 ps/nm (≈60 km of G.652). This eliminates the need of any DCF, otherwise essentially at so high bit-rate to compensate for the signal distortions.

Although the AWG-2 filter shape was not exactly Gaussian, the signal showed a clear eye opening after demodulation (see FIG. 1*b*). The demodulated downstream signal by AWG-2 underwent a power splitter used to emulate a time division multiple access (TDMA) operation before to be fed into a colorless ONU.

At the ONU, the signal was further split by means of a 1:2 splitter. A fraction was sent to the receiver; the other one was sent to the upstream transmitter for re-modulation. The ONU receiver comprised a variable optical attenuator (VOA1), and a photodiode. Bit error rate (BER) measurements were taken by an error analyzer. The ONU transmitter was realized by means of 20 dB small signal gain, 5 dBm output saturated power at 80 mA, and PDG<1.5 dB. The 1 Gb/s IM $2^7-1$ PRBS upstream signal was generated by the RSOA, which re-modulated directly the demodulated 20 Gb/s downstream traffic. Note that the modulation amplitude of the demodulated downstream (ER=6.6) is squeezed by gain-saturation of the RSOA. A power splitter with a splitting ratio of 1:4 guaranteed an input power at the RSOA equal to −14 dBm, producing an upstream signal with launching power of 5 dBm.

The re-modulated upstream signal was pre-amplified by the SOA. It should be noted that the DPSK downstream signals, having higher power and CE, effectively clamped the SOA gain. Therefore the device, saturated by the downstream signals, provided a compressed gain of 9 dB. At the CO, the upstream traffic was selected by the OC and passed through a small size DCF module (compensating 170 ps/nm/km). It is needed because the detected IM signal has still some residual DPSK modulation, being generated by re-modulating the high bit rate downstream signal. However, note its loss is low and is not critical. The upstream traffic was then wavelength demultiplexed by means of a 100 GHz bandpass filter (BPF) and eventually received by an avalanche photo-diode (APD) receiver.

To emulate the other seven upstream signals and evaluate their impact on the SOA dynamics, we used an additional 1 Gb/s modulated signal at $\lambda_s$=1549.3 nm having an optical power of 2 dBm after the AWG-2. Note that the 7 upstream channels carried the same information and were all in-phase: this is the worst situation, for the XGM effects.

The PON performance was determined by BER measurements, which are shown in FIG. 3 of the accompanying drawings. In FIG. 3*a* we compare the back-to-back BER measurements of downstream traffic for two values of ER: 1.0.2 dB (the maximum available with our equipment) and 6.6 dB, which was the optimum value was used in the experiment. In both cases, we used the AWG-2 as DPSK demodulator. Due to the lower ER, we had 1.4 dB of penalty at $10^{-9}$, even with no upstream signal. When the entire system was evaluated by including the upstream signal re-modulated by the RSOA and also the other emulated by channels, the recorded penalties were 2.3 and 2.8 dB, respectively. The limited additional penalty is due to the XGM modulation induced by the power increase of the upstream channels.

In FIG. 3*a* we also report a BER comparison between the back-to-back and the transmitted signal (ER-6.6 dB) after 20 km of SMF. The negligible penalty confirms the effectiveness of the AWG-based detection system by eliminating any DCF and its corresponding losses.

BER measurements on the upstream traffic were reported in FIG. 3b. We had a 3 dB penalty at BER–$10^{-9}$ in respect to the back-to-back. The penalty is caused in part by the lower ER and in part by the back-reflections. Indeed, in order to reduce spurious reflections from the SOA, we operated the SOA in a low driving current regime (340 mA), thus decreasing its (saturated) gain to 9 dB; this provides the optimal trade-off that minimizes reflections and ensures that the required amount of power reaches the ONU.

The invention claimed is:

1. An optical network comprising:
   a central office which is arranged to generate N differential phase shift key modulated optical signals, where N is an integer greater than 1,
   optical coupling means arranged to connect the N signals to at least one optical waveguide,
   a passive distribution node located remotely from the central office which has at least one input port that is coupled to the waveguide and a plurality of output ports, the node being arranged to transmit a first wavelength of the N signals to at least one of its output ports, and
   at least one optical network unit connected through a respective optical wave guide to the first output port of the passive distribution node,
   wherein the passive distribution node comprises an arrayed waveguide grating arranged to provide a passive optical connection between its input port and the first output port and which for that connection functions as a bandpass filter having a profile and bandwidth selected such that the differential phase shift key modulated optical signal passed to the input port is converted to an intensity modulated signal at the output port.

2. An optical network according to claim 1 in which the arrayed waveguide grating functions as a bandpass filter having a bandwidth of between 0.4 and 0.7 times the bit rate of the differential phase shift key signal.

3. An optical network according to claim 2 in which the arrayed waveguide grating has a bandwidth of substantially 0.6 times the bit rate of the differential phase shift key modulated optical signal.

4. An optical network according to claim 1, in which the arrayed waveguide grating functions as a filter having a substantially Gaussian profile in the frequency domain.

5. An optical network according to claim 1, in which said optical network unit comprises a direct detector, such as a photodetector which is arranged to measure the intensity of the signal output from the respective output port of the arrayed waveguide grating.

6. An optical network according to claim 1, in which the or each optical network unit includes a reflective semiconductor optical amplifier that is arranged to modulate the received signal and retransmits it back to the passive distribution node.

7. An optical network according to claim 1, in which the central office is arranged to time division multipex the differential phase shift key modulated optical signals.

8. An optical network according to claim 1, in which the central office is arranged to transmit differential phase shift key modulated signals with a wavelength of substantially 1550 nm.

9. An optical network according to claim 1, in which the central office is arranged to modulate the signals at a rate of 20 Gbits/seconds and the arrayed waveguide grating has a bandwidth of 12 Ghz.

10. An optical network according to claim 1, in which the network is a passive optical network.

11. An optical network according claim 1, further comprising a semiconductor optical amplifier arranged to amplify the signals generated by the central office.

12. An optical network according to claim 1, wherein each of said output ports is suitable for connection to an optical network unit, the arrayed waveguide grating being arranged to provide a passive optical connection between said input port and each of said output ports, the arrayed waveguide grating being arranged to function as a bandpass filter having a substantially Gaussian profile in the frequency domain with respect to each connection between the input port and the output ports.

13. A passive distribution node for use in a passive optical network, the node comprising:
   an arrayed waveguide grating having at least one input port for connection to a central office; and
   a plurality of output ports, each output port being suitable for connection to an optical network unit,
   the arrayed waveguide grating being arranged to provide a passive optical connection between said input port and each of the output ports, and to function as a bandpass filter having a profile and bandwidth such that a differential phase shift key modulated optical signal received on the input port is converted to an intensity modulated signal at a respective one of the output ports.

14. A method of operating an optical network, comprising:
   generating N differential phase shift key modulated optical signals of different wavelengths at a central office, where N is an integer greater than 1;
   connecting the N signals to at least one optical waveguide for transmission to a passive distribution node located remote from the central office;
   receiving the N signals at the passive distribution node;
   demultiplexing the N differential phase shift key modulated optical signals at the passive distribution node, whilst also converting the differential phase shift key modulated optical signals to intensity modulated signals, each intensity modulated signal being output from a different output port for transmission to a respective optical network unit;
   wherein the demultiplexing and conversion is performed by an arrayed waveguide grating having a bandwidth and profile such that the differential phase shift key modulated optical signal passed to the input port is converted to an intensity modulated signal at the output port.

15. A method as claimed in claim 14, further comprising amplifying the N signals generated by the central office using a semiconductor optical amplifier.

\* \* \* \* \*

UNITED STATES PATENT AND TRADEMARK OFFICE
CERTIFICATE OF CORRECTION

PATENT NO. : 8,478,125 B2
APPLICATION NO. : 12/600606
DATED : July 2, 2013
INVENTOR(S) : Calabretta et al.

It is certified that error appears in the above-identified patent and that said Letters Patent is hereby corrected as shown below:

On Title Page 2, in Item (56), under "OTHER PUBLICATIONS", in Column 1, Line 8, delete "Catlonia," and insert -- Catalonia, --, therefor.

In the Specification

In Column 1, Lines 6-9, delete "PCT/EP2008/055005, filed 24 Apr. 2008, ....by reference." and insert the same at line 5, after "Application No.", as a continuation paragraph.

In Column 1, Line 63, delete "Zender" and insert -- Zehnder --, therefor.

In Column 2, Lines 1-2, delete "interfermoter" and insert -- interferometer --, therefor.

In Column 2, Line 5, delete "interfermoter" and insert -- interferometer --, therefor.

In Column 2, Line 51, delete "bandwidth," and insert -- bandwidth. --, therefor.

In Column 2, Line 53, delete "domain," and insert -- domain. --, therefor.

In Column 3, Line 40, delete "Gausian" and insert -- Gaussian --, therefor.

In Column 3, Line 44, delete "gausian" and insert -- gaussian --, therefor.

In Column 3, Line 53, delete "20 ghz" and insert -- 20 Ghz --, therefor.

In Column 3, Line 55, delete "24 Ghx" and insert -- 24 Ghz --, therefor.

In Column 3, Line 63, delete "LIST OF FIGURES" and insert -- BRIEF DESCRIPTION OF THE DRAWINGS --, therefor.

Signed and Sealed this
Thirty-first Day of December, 2013

Margaret A. Focarino
*Commissioner for Patents of the United States Patent and Trademark Office*

CERTIFICATE OF CORRECTION (continued)
U.S. Pat. No. 8,478,125 B2

In Column 5, Line 8, delete "freespace" and insert -- free space --, therefor.

In Column 5, Line 57, delete "D-16.5" and insert -- D=16.5 --, therefor.

In Column 5, Line 66, delete "channel," and insert -- channel. --, therefor.

In Column 6, Line 52, delete "ER: 1.0.2 dB" and insert -- ER: 10.2 dB --, therefor.

In Column 6, Line 64, delete "(ER-6.6 dB)" and insert -- (ER=6.6 dB) --, therefor.

In Column 7, Line 2, delete "BER-$10^{-9}$" and insert -- BER=$10^{-9}$ --, therefor.

In the Claims

In Column 7, Line 54, in Claim 7, delete "multipex" and insert -- multiplex --, therefor.